(12) United States Patent
Geelen et al.

(10) Patent No.: US 8,554,471 B2
(45) Date of Patent: Oct. 8, 2013

(54) NAVIGATION DEVICE AND METHOD FOR CONVEYING INFORMATION RELATIONSHIPS

(75) Inventors: Pieter Geelen, Amsterdam (NL); Erik Thomassen, Amsterdam (NL)

(73) Assignee: TomTom International B.V., Amsterdam (NL)

( * ) Notice: Subject to any disclaimer, the term of this patent is extended or adjusted under 35 U.S.C. 154(b) by 728 days.

(21) Appl. No.: 11/712,563

(22) Filed: Mar. 1, 2007

(65) Prior Publication Data

US 2007/0255491 A1    Nov. 1, 2007

(51) Int. Cl.
*G01C 21/00* (2006.01)
*G08G 1/123* (2006.01)
*H04B 1/06* (2006.01)

(52) U.S. Cl.
USPC .................. 701/410; 340/995.27; 455/238.1

(58) Field of Classification Search
USPC .......... 701/200–226, 400–541; 340/988–996, 340/539.2, 539.13, 539.11, 815.4–815.55; 342/357.23, 357.25, 352, 357.2; 455/456.6, 457, 9
See application file for complete search history.

(56) References Cited

U.S. PATENT DOCUMENTS

| | | | |
|---|---|---|---|
| 4,153,874 A | 5/1979 | Kaestner | |
| 4,550,317 A | 10/1985 | Moriyama et al. | |
| 5,465,089 A | 11/1995 | Nakatani et al. | |
| 6,445,397 B1 | 9/2002 | Boyer | |
| 6,778,074 B1 * | 8/2004 | Cuozzo | 340/441 |
| 7,323,970 B1 * | 1/2008 | Murray et al. | 340/426.12 |
| 2001/0044678 A1 * | 11/2001 | Ito et al. | 701/1 |
| 2002/0019293 A1 * | 2/2002 | Noda et al. | 477/169 |
| 2003/0112269 A1 * | 6/2003 | Lentz et al. | 345/738 |
| 2003/0191568 A1 * | 10/2003 | Breed | 701/36 |
| 2004/0133345 A1 | 7/2004 | Asahara | |
| 2004/0243307 A1 * | 12/2004 | Geelen | 701/213 |
| 2005/0080558 A1 | 4/2005 | Kasai | |
| 2005/0190197 A1 * | 9/2005 | Ebi | 345/589 |
| 2007/0001830 A1 * | 1/2007 | Dagci et al. | 340/438 |
| 2007/0115113 A1 * | 5/2007 | Wang | 340/539.13 |

FOREIGN PATENT DOCUMENTS

| | | |
|---|---|---|
| CN | 2033144 U | 2/1989 |
| CN | 1517678 A | 8/2004 |
| CN | 1536539 A | 10/2004 |

(Continued)

OTHER PUBLICATIONS

International Search Report issued Nov. 24, 2008 for International Application No. PCT/EP2007/002168.

*Primary Examiner* — Muhammad Shafi

(57) ABSTRACT

A method and device are disclosed for conveying information relationships. In one embodiment, the method includes prompting, in a navigation device, at least one of input and selection of a travel destination and a desired arrival time at the travel destination; calculating an arrival time during travel to the travel destination; and outputting via the navigation device, during travel to the travel destination, an indication of a relationship between the desired arrival time and the calculated arrival time. In another embodiment, the method includes inputting a travel destination on a navigation device; determining a travel route to the input travel destination; calculating a speed in a navigation device during travel to the travel destination along the determined route; and outputting, via the navigation device, an indication of a relationship between a permitted speed and the calculated speed.

16 Claims, 6 Drawing Sheets

(56) References Cited

FOREIGN PATENT DOCUMENTS

| | | |
|---|---|---|
| EP | 1162102 A2 | 12/2001 |
| EP | 1465134 A1 | 10/2004 |
| EP | 1467182 A1 | 10/2004 |
| EP | 1548684 A2 | 6/2005 |
| JP | 11039592 A | 2/1999 |
| JP | 2000065589 A | 3/2000 |
| JP | 2002310672 A | 10/2002 |
| JP | 2004061236 A | 2/2004 |
| JP | 2004093422 A | 3/2004 |
| JP | 2004226168 A | 8/2004 |
| JP | 2005332004 A | 12/2005 |
| JP | 2006010609 A | 1/2006 |
| JP | 9007087 A | 1/2007 |

* cited by examiner ized that the specific examples in the following descrip-
NAVIGATION DEVICE AND METHOD FOR CONVEYING INFORMATION RELATIONSHIPS

CO-PENDING APPLICATIONS

The following applications are being filed concurrently with the present applications. The entire contents of each of the following applications is hereby incorporated herein by reference: A NAVIGATION DEVICE AND METHOD FOR STORING AND UTILIZING A LAST DOCKED LOCATION (application Ser. No. 11/712,573 filed on even date herewith; A METHOD AND DEVICE FOR UTILIZING A SELECTABLE LOCATION MARKER FOR RELATIONAL DISPLAY OF POINT OF INTEREST ENTRIES (application Ser. No. 11/712,572) filed on even date herewith; A METHOD AND DEVICE FOR MAP SWITCHING (application Ser. No.11/712,578)filed on even date herewith; A NAVIGATION DEVICE AND METHOD OF UPDATING INFORMATION ON A NAVIGATION DEVICE (application Ser. No.11/712,571) filed on even date herewith; A NAVIGATION DEVICE, SERVER, AND METHOD FOR COMMUNICATING THEREBETWEEN (application Ser. No. 11/712,603)filed on even date herewith; A METHOD AND DEVICE FOR PROVIDING PREFERENCES DURING ROUTE TRAVEL CALCULATION ON A NAVIGATION DEVICE (application Ser. No. 11/712,562) filed on even date herewith; A NAVIGATION DEVICE AND METHOD OF ACTIVATING INFORMATION ON A NAVIGATION DEVICE (application Ser. No.11/712,565) filed on even date herewith; AUTOMATIC DISCOVERY OF WIRELESS COMMUNICATION SETTINGS (application Ser. No.11/713,090) filed on even date herewith; A NAVIGATION DEVICE AND METHOD OF IMPLEMENTING AUDIO FEATURES IN A NAVIGATION DEVICE (application Ser. No. 12/736,557)filed on even date herewith; METHODS OF CUSTOMIZING NAVIGATION SYSTEMS (application Ser No. 11/713,089)filed on even date herewith; and A NAVIGATION DEVICE AND METHOD FOR SEQUENTIAL MAP DISPLAY (application Ser. No.11/712,56)filed on even date herewith.

PRIORITY STATEMENT

The present application hereby claims priority under 35 U.S.C. §119 on each of Great Britain Patent Application numbers 0604709.6 filed Mar. 8, 2006; 0604708.8 filed Mar. 8, 2006; 0604710.4 filed Mar. 8, 2006; 0604704.7 filed Mar. 8, 2006; and 0604706.2 filed Mar. 8, 2006, the entire contents of each of which is hereby incorporated herein by reference.

FIELD

The present application generally relates to navigation methods and devices.

BACKGROUND

Known navigation devices are able to provide a user with a travel route to a travel destination, input from a user. A user of the navigation device can use the device to arrive at the travel destination via a number of different alternative routes, some of which may take longer than others. As the user travels, the route may even change (if the user makes a wrong turn, for example).

However, which route will be the fastest route is many times unpredictable as accidents can occur, road conditions can change, traffic patterns can vary, roads can be out or under construction, etc. Thus, the user of the navigation device must separately manage the use of the navigation device to allow him to plan a route to a desired travel destination, and a time at which the user would like to arrive at the travel destination.

SUMMARY

In at least one embodiment, the present application is directed to a method of providing an indication of leeway to a user, either in terms of arrival time or speed. With such an indication of leeway, a user of a navigation device can be notified of how he/she is doing in relation to an expected arrival time at a travel destination.

In at least one embodiment, a method includes prompting, in a navigation device, at least one of input and selection of a travel destination and a desired arrival time at the travel destination; calculating an arrival time during travel to the travel destination; and outputting via the navigation device, during travel to the travel destination, an indication of a relationship between the desired arrival time and the calculated arrival time.

In at least one other embodiment, the present application is directed to a navigation device. The navigation device of at least one embodiment includes an integrated input and display device to prompt at least one of input and selection of a travel destination and a desired arrival time; and a processor to calculate an arrival time during travel to the travel destination. The integrated input and display device is further used to output, during travel to the travel destination, an indication of a relationship between the desired arrival time and the calculated arrival time.

In at least one other embodiment of the present application, a method of providing a relationship between a permitted and calculated speed is provided. Such a method, in at least one embodiment, includes inputting a travel destination on a navigation device; determining a travel route to the input travel destination; calculating a speed in a navigation device during travel to the travel destination along the determined route; and outputting, via the navigation device, an indication of a relationship between a permitted speed and the calculated speed.

In at least one other embodiment, a navigation device is provided, the navigation device including an integrated input and display device to prompt input of a travel destination on a navigation device; and a processor to determine a travel route to the input travel destination. The integrated input and display device is further used to output, during travel to the travel destination along the determined route, an indication of a relationship between a permitted speed and the calculated speed.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

Figure 1:
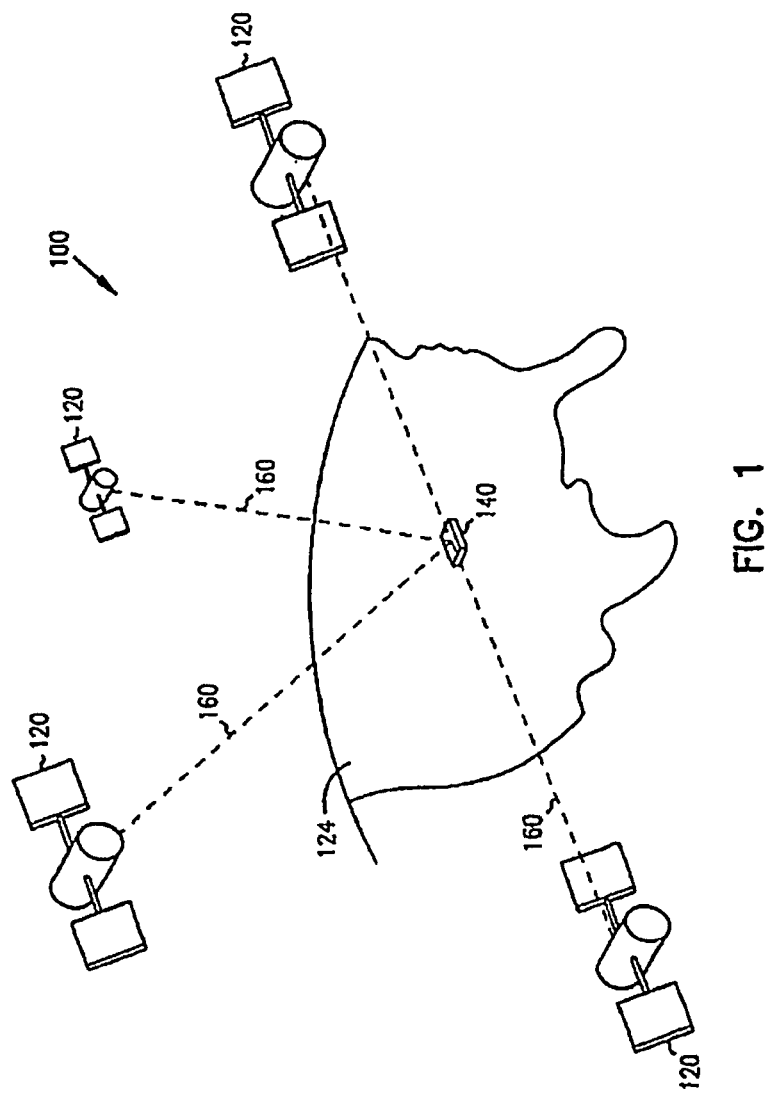
FIG. 1 illustrates an example view of a Global Positioning System (GPS)

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

FIG. 1 illustrates an example view of Global Positioning System (GPS), usable by navigation devices, including the navigation device 200 of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
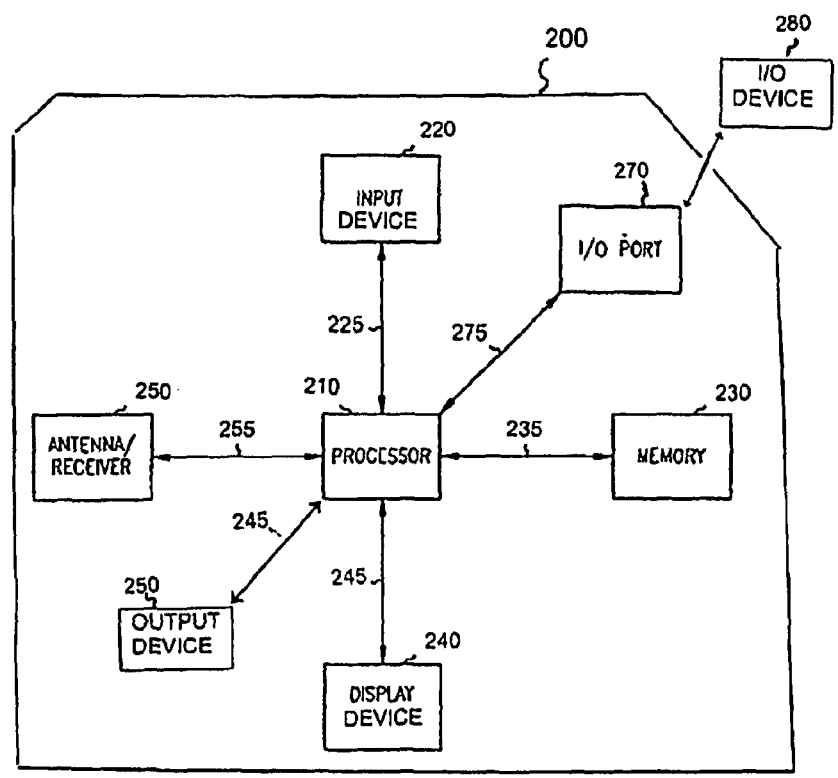
FIG. 2 illustrates an example block diagram of electronic components of a navigation device of an embodiment of the present application.

FIG. 2 illustrates an example block diagram of electronic components of a navigation device 200 of an embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 250 can produce audible information to a user of the navigation device 200, it is equally understood that input device 240 can also include a microphone and software for receiving input voice commands as well.

In the navigation device 200, processor 210 is operatively connected to and set to receive input information from input device 240 via a connection 225, and operatively connected to at least one of display screen 240 and output device 250, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection (via Bluetooth technology for example)

between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle, for example a car, motorbike, motorcycle, boat, etc. Such a navigation device 200 is then removable from the docked location for portable or handheld navigation use. The portable handheld navigation device 200 might be used by pedestrians or bikers as well, for example.

Figure 3:
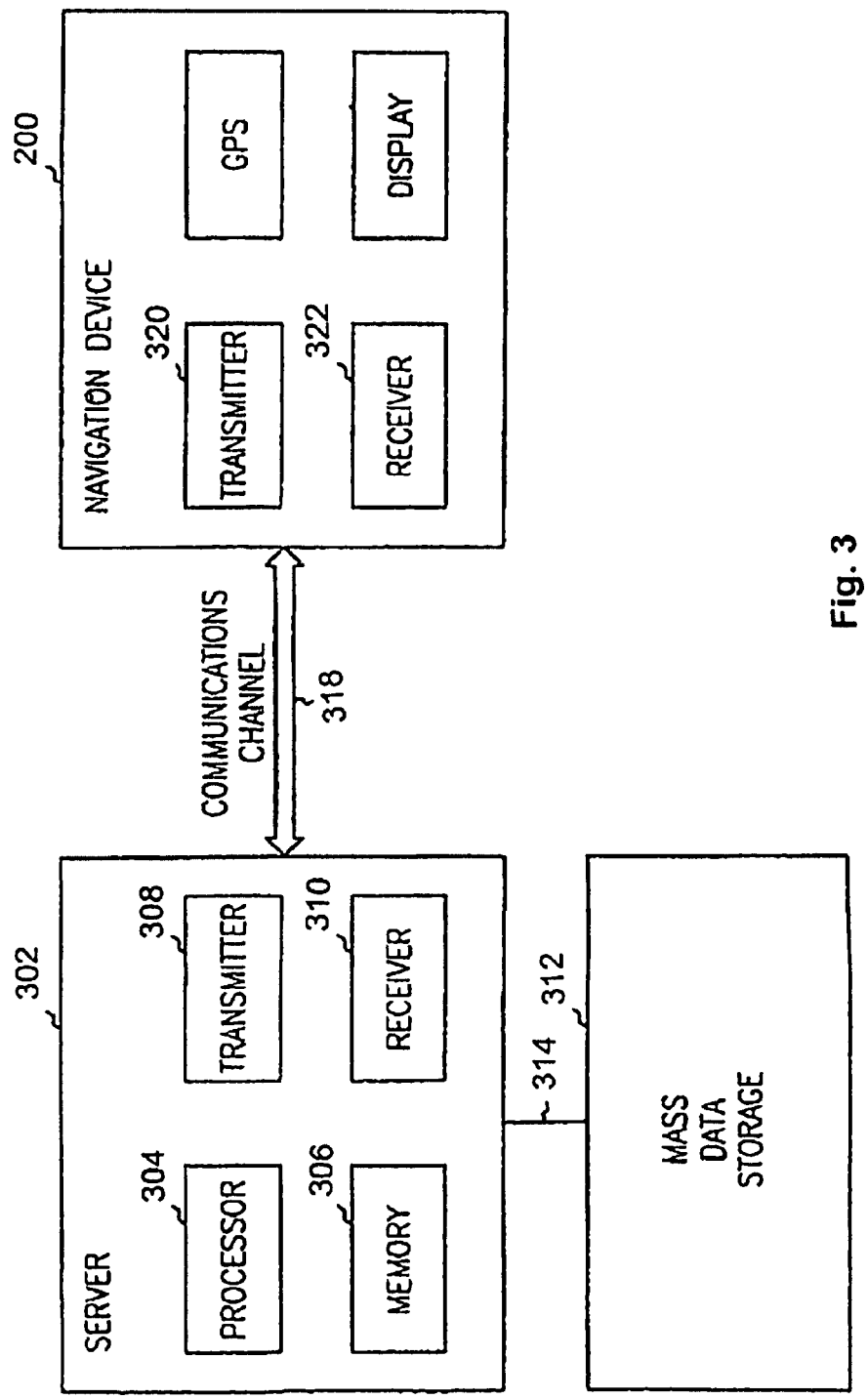
FIG. 3 illustrates an example block diagram of a server, navigation device and connection therebetween of an embodiment of the present application.

FIG. 3 illustrates an example block diagram of a server 302 and a navigation device 200 of the present application, via a generic communications channel 318, of an embodiment of the present application. The server 302 and a navigation device 200 of the present application can communicate when a connection via communications channel 318 is established between the server 302 and the navigation device 200 (noting that such a connection can be a data connection via mobile device; such as through the use of Bluetooth technology, for example; a direct connection via personal computer via the internet; etc.).

The navigation device 200, in at least one embodiment, may establish a "mobile" network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card, complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks. Furthermore, in at least one embodiment, the communication channel 318 may be capable of accommodating wireless communication such as radio frequency, microwave frequency, infrared communication, etc. Additionally, according to at least one embodiment, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-Roms for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and Bluetooth connection for example. For many dynamic calculations, the processor 304 in the server 302 may be used to handle the bulk of the processing needs, however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

In an embodiment of the present application, a method is disclosed for providing an indication of arrival leeway (or lack thereof to a user of the navigation device 200. The method includes prompting, in the navigation device 200, at least one of input and selection of a travel destination and a desired arrival time at the travel destination; calculating an arrival time during travel to the travel destination; and outputting via the navigation device 200, during travel to the travel destination, an indication of a relationship between the desired arrival time and the calculated arrival time. A further discussion of an example embodiment of the method is as follows.

Figure 4:
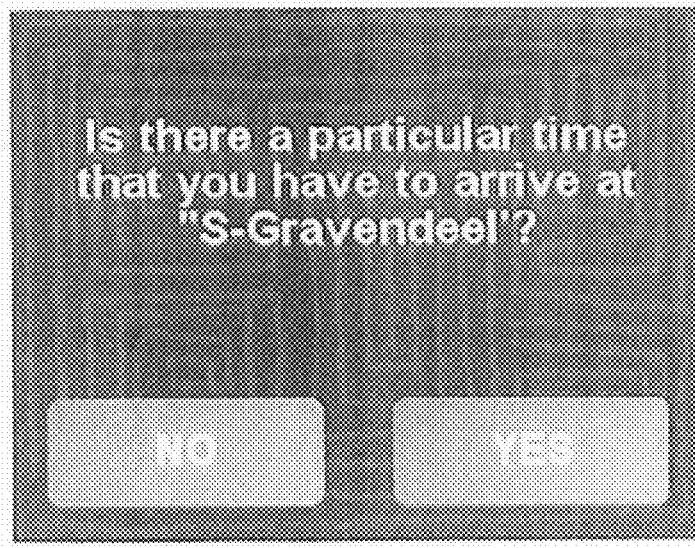
FIG. 4 illustrates an example input/display screen for prompting input of a desired arrival time at a travel destination.

A user utilizes the navigation device 200 of FIG. 2 of the present application. The user of the navigation device 200, in connection with an embodiment of the present application, is prompted not only to input a travel destination (the input including any type of selection of a plurality of inputs, inputting selecting an address, etc.) or desired end point of travel, but a user is further prompted with input of a desired arrival time at the travel destination. For example, as shown in FIG. 4, after input of the travel destination of S-Gravendeel for example, the user may be prompted for a desired arrival time, such as by the display screen 240 displaying "is there a particular time that you have to arrive at 'S-Gravendeel?'", for example.

Figure 5:
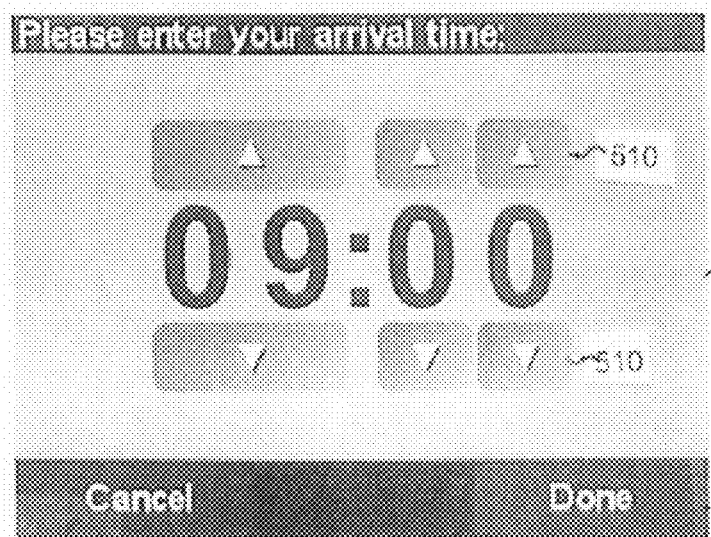
FIG. 5 illustrates an example input/display screen for entry of a desired arrival time at a travel destination.

If the answer is yes, the user may then be prompted to enter a desired arrival time at the travel destination, by display of an adjustable clock input such as the 09:00 as shown in FIG. 5 of the present application. Alternatively, any other type of prompt may be used, wherein the user can enter the desired arrival time in any manner, wherein the present application is not limited to any particular type of entry.

In at least one embodiment, the user may be initially prompted with an estimated arrival time. This can be determined, for example, based upon a calculation done by processor 210 for example, wherein a distance between an input travel destination and a starting location (either entered by the user or determined utilizing GPS location of the navigation device 200) is divided by an average travel speed (such as 50 kilometers per hour for example). Alternatively, the estimated and calculated number can be rounded up to a whole number, such as the number of hours, number of minutes, etc. Again, the distance calculation may be done by the processor 210 calculating the distance between the current coordinates of the device (either input or through GPS retrieval) and the coordinates of the input travel destination.

In this example embodiment, if the user is prompted with a suggested or estimated arrival time, the user can merely accept that time, adjust the time by use of the virtual buttons 510 shown in FIG. 5 for example (or in any other known manner), or can merely hit the cancel (or next) button to allow entry of a new time. When completed, the user can then select the "done" button 530, for example.

Once such a desired arrival time at the travel destination is input (via input and/or selection of an estimated arrival time for example), this desired arrival time can then be used in conjunction with a calculated arrival time, calculated and updated during travel to the travel destination, to produce a relationship or a leeway to the user (or lack thereof), for example, between the desired arrival time and the calculated arrival time. Such a relationship can be output to the user as an indication of a relationship between the desired arrival time and the calculated arrival time, via display screen 240 or via another output mechanism 250 of the navigation device 200, for example. An example embodiment includes a visual display on display screen 240 of the navigation device 200 for example.

Figure 6:
FIGS. 6 and 7 illustrate a display of a navigation system 200 of an example embodiment of the present application.

FIG. 6 shows a display 240 of a navigation system 200 of an example embodiment of the present application. This display 240 includes a display 605 of the current time remaining to the travel destination; a distance 615 to the destination; and a display 620 indicative of a relationship between the desired arrival time and the calculated arrival time, namely the leeway (or lack thereof in arriving at the travel destination at the desired arrival time.

As shown in FIG. 6, an example indication 620 of the relationship between the desired arrival time and the calculated arrival time is seven minutes. This output indication may, in at least one embodiment, be a color display, wherein the color conveys at least one of a positive, negative, and neutral relationship between the desired arrival time and the calculated arrival time. For example, the color display can include at least one of red, yellow, and green color, with a red color conveying an expected relatively delayed arrival in relation to the desired arrival time for example, the yellow color conveying an expected on-time arrival in relation to the desired arrival time for example, and the green color conveying an expected relatively early arrival in relation to the desired arrival time for example.

Calculations used to produce such a display as shown in FIG. 6 (and also in FIG. 7) can be calculated by processor 210 utilizing various set/stored thresholds for example. In one example embodiment, a green color can be used for display when the output indication exceeds a certain time, such as five minutes for example (thereby indicating that the calculated arrival time currently exceeds the desired arrival time by more than five minutes); the yellow color can be used when the threshold is not exceeded, but when a second lower threshold is exceeded (for example, if the calculated arrival time currently exceeds the desired arrival time by five minutes or less, but not less than zero minutes); and the red color can be used when the second lower threshold is not met (for example when the calculated arrival time currently trails the desired arrival time (namely when the difference is negative or less than zero minutes). Again, the present application is not limited by the particular example thresholds, colors, and calculations described above.

Based on such a device/method, a user can be constantly updated as to the status of a desired "on-time" arrival. If the color conveys a positive relationship between the desired arrival time and the calculated arrival time (such as by display of a green color for example), the user can know that his pace is good, or that he has time to stop for gas, etc. If the output indication is one of a neutral relationship between the desired arrival time and the calculated arrival time (such as by display of a yellow color for example), the user can either decide to speed up, call ahead and indicate the possibility of being late, or take some other measure to ensure or further improve his chances of an on-time arrival at the travel destination. Alternatively, if the output indication displays a negative relationship between desired arrival time and calculated arrival time, the user can call someone at the travel destination and indicate that he is going to be late, or take other measures in an effort to ensure an on time arrival at the travel destination, for example.

Figure 7:

As shown in FIGS. 6 and 7, the output indication of relationship between the desired arrival time and the calculated arrival time can also include a numerical display. In FIG. 6, the numerical display 620 indicates seven minutes and may be displayed, for example, in a green color (not shown). Such a numerical display 620 of FIG. 6 conveys a positive relationship between the desired arrival time and the calculated arrival time. As shown in FIG. 7, the display 720 indicates negative four minutes. Such a numerical display conveys a negative relationship between desired arrival time and the calculated arrival time.

Either of the numerical displays 620/720 can convey such a relationship by themselves, and/or can be combined with color display such as a red color display, to again further convey the negative relationship between desired arrival time and calculated arrival time. Similarly, the display 620 of FIG. 6 can further convey a positive arrival time by including a "+" symbol along with a numerical display, to convey a positive relationship between the desired arrival time and the calculated arrival time, and/or can be combined with a color display to again convey the aforementioned positive relationship. Accordingly, a negative (for example red) color and a negative (for example the minus, "−") symbol and/or numerical display can be combined, and/or the minus symbol and a numerical display can be combined; and a positive (for example green) color and a positive (for example the plus, "+") symbol and/or numerical display can be combined, and/or the plus symbol and a numerical display can be combined.

In addition, other indicators can be used, such as a blinking display (for example) when between the two threshold values, to convey an indication of a relationship between the desired arrival time and the calculated arrival time being five minutes or less, for example. This can be used by itself, and/or can be used in combination with a yellow color or another color to indicate a neutral relationship between the desired arrival time and the calculated arrival time. Alternatively, the blinking display can be used to signify a negative relationship between desired arrival time and the calculated arrival time.

Other variations, other than color and numerical indications, can also be used and are also within the scope of the present application.

Further, the output indication can include other outputs such as an audible output for example, including a time value in minutes, including a warning to convey a negative relationship, etc. Such additional output indications can be combined with the display output indications described above.

As shown in FIGS. 6 and 7, in at least one embodiment of the application, the navigation device further outputs map information, with the indication between the desired arrival time and the calculated arrival time being output in conjunction with the map information. Thus, the leeway (or lack thereof) between desired arrival time and calculated arrival time can be displayed on the display 240 of the navigation device 200, in addition with other information that may or may not typically be displayed.

As far as when the output indication is updated, the output indication can be updated in any number of ways and at any number of times. For example, an output indication update can occur upon a difference between desired arrival time and the calculated time exceeding a threshold, can occur anytime a numerical change in value is made, can be updated periodically, can be updated anytime a color conveying at least one of a positive, negative, and neutral relationship between the desired arrival time and the calculated arrival time changes, etc.

In at least one other embodiment of the present application, a navigation device 200 is used to convey leeway information or lack thereof. The navigation device 200 includes, for example, an integrated input and display device (integrating the input 220 and display 240 of FIG. 2 for example) to prompt at least one of input and selection of a travel destination and a desired arrival time, and a processor 210 to calculate an arrival time during travel to the travel destination. The integrated input and display device may further be used to output, during travel to the travel destination, an indication of a relationship between the desired arrival time and the calculated arrival time.

The input device 220 and display screen 240 can be separated, but preferably are integrated in a touch screen format for example. Also, alternative (or additional) input devices 220 can be utilized to input or select at least one of a travel destination and desired arrival time; for example, to select any one of a plurality of predisplayed travel destinations and/or adjust or accept an estimated desired arrival time such as that shown in FIG. 5 for example.

It should be noted that for any embodiments of the present application, input and/or selection of a travel destination and/or a desired arrival time can be made via any type of input or selection, including, but not limited to touch screen input or selection, keyboard input or selection, audible input or selection, etc. Further, for each of the embodiments of the present application, a navigation device may prompt at least one of input and selection of both a travel destination and desired arrival time at the travel destination, noting that the travel destination may be displayed as a selectable list of destinations from which a selection can be made.

In at least one embodiment of the present application, a status bar as shown in FIGS. 6 and 7 will typically display various types of information. In at least one embodiment of the present application, if the user enables everything in the status bar shown in FIGS. 6 and 7, the leeway aspect of the present application can override a displayed field, such as the "current time" field, for example, that was previously displayed. The leeway field may be added to the status bar if the user has specified, via at least one of input and selection, for example, an arrival time for a current route. If the status bar already contains a current time field, the leeway aspect of the present application can replace that field and thus, when the user is traveling with leeway, a current time may not be displayed. However, the embodiments of the present application should not be limited of this example, as the leeway field can be added and/or the status bar can be expanded to include a display of both leeway and current time. Accordingly, the embodiments of the present application encompass any such variations.

The aspect of requesting/prompting of an arrival time can be something that is activated in advance in a preference/options enable/disable aspect. Thus, a preference menu may be displayed to a user of the navigation device 200 to switch a feature on or off regarding asking arrival time or not asking arrival time, for example. Such a feature may be enabled by a default, namely the feature of asking arrival times; however, if the user answers no a certain plurality of times in a row, then the system can be set to ask if the user would prefer that he never be asked about arrival times again, noting that the feature can be turned back on at a later time for example.

Thus, using the enable/disable preference, the method of at least one embodiment can further include prompting, for selection, a preference, to enable such a preference, to prompt at least one of input and selection of a desired arrival time subsequent to at least one of input and selection of the travel destination, wherein upon selection of the preference (to enable the preference for example), input of the desired arrival time is prompted subsequent to at least one of input and selection of the travel destination. Alternatively, the method of at least one embodiment may include prompting, for selection, an option to at least one of enable and disable the automatic prompting of at least one of input and selection of the desired arrival time, subsequent to the at least one of input and selection of the travel destination. Finally, the method of at least one embodiment may include prompting which includes automatically prompting at least one of input and selection of the desired arrival time, subsequent to the at least one of input and selection of the travel destination.

In an alternative embodiment of the present application, a method includes inputting a travel destination on the navigation device, determining a travel route to the input travel destination, calculating a speed in a navigation device during travel to the travel destination along the determined route, and outputting, via the navigation device, an indication of a relationship between the permitted speed and the calculated speed. Such an output indication can be varied in a manner similar to the output indication of a relationship between the desired arrival time and calculated arrival time (leeway or lack thereof as previously discussed above, including, but not limited to, outputting of a color display conveying positive, negative, and neutral relationships between the permitted speed and the calculated speed; indicating positive, negative, and neutral relationships of the permitted speed and the calculated speed in other ways (numerical, positive/negative indicators, blinking, etc.).

The memory 230 of the navigation device 200 can store maximum and/or average road speeds and/or traffic conditions for particular roads for example, and the processor 210 can calculate current speed. For example, the processor 210 can calculate current speed using two GPS positions (a past position of the travel route and a current position along the travel route), a distance between the two GPS positions along the particular travel route, and a time difference between when the navigation device 200 reached the first GPS position and the second GPS position along the travel route. Thus, processor 210, in conjunction with memory 230, can constantly calculate a speed during travel to a travel destination along a determined route, and constantly output such a speed (via an output indication of the relationship between the current calculated speed and the permitted speed) to a display screen 240. Thus, utilizing the calculated speed and using known speeds stored in memory 230, including known maximum and/or average road speeds and/or traffic conditions which are available for all roads and highways, the processor 210 can output an indication of relationship between the permitted speed and the calculated speed in any number of different ways, similar to that of the leeway embodiment of the present application as previously described.

Figure 8:
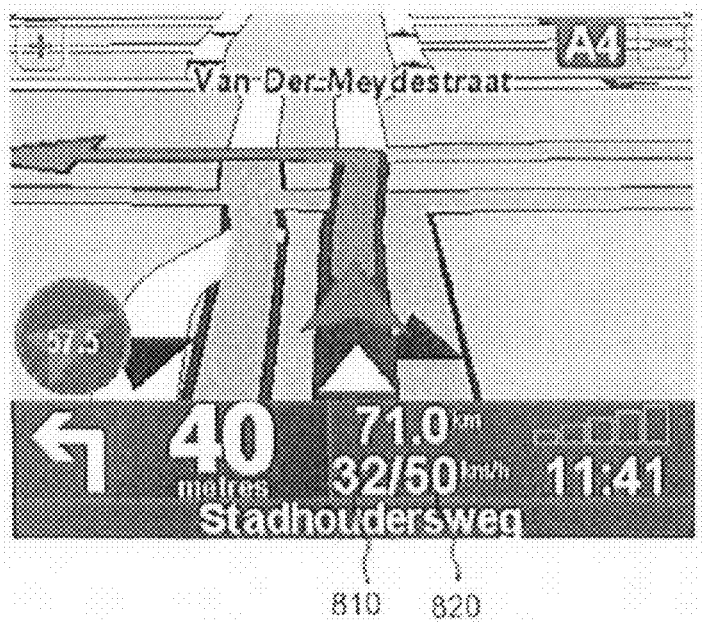
FIG. 8 illustrates a display of a navigation system 200 of another example embodiment of the present application, regarding a permitted speed and calculated speed relationship.

As shown in FIG. 8, the display screen 240 of the navigation device can display both calculated speed 810 and permitted speed 820. The display can include the display of the two values in relation to one another, and/or can include a color display, numerical display, etc. in a manner previously described regarding the leeway embodiment of the present application.

Further, in one example embodiment, the font sized used for speed may automatically zoom out slowly when the text will not fit in the display area and the digits for displaying the speed may be somewhat smaller than other digits in the status area.

In at least one embodiment, whenever a user is speeding, and thus whenever there is a negative relationship between a permitted speed and the calculated speed is reached, the speed may be displayed in red (for example) if the user is speeding above a particular threshold (such as 5 kilometers per hour, for example). Further, the display may or may not turn red until the user is speeding at a certain speed above a particular threshold, unless combined with such speeding above the threshold for a duration of a particular time for example. Thus, both speed and time may be combined in the calculation, for example. For example, the speed may not be displayed in red until the user is speeding at least 5 kilometers per hour over the permitted speed for a duration of at least 5 seconds.

Alternatively, the aforementioned relationship of a speed around 5 KPH above the speed limit may indicate a neutral relationship between a permitted speed and the calculated speed, and thus may be displayed in yellow for example, wherein exceeding the speed limit by 10 kilometers per hour (and/or for a particular duration for example) may be displayed in red for example. These are merely examples, as other permutations and combinations of aspects of the leeway embodiment, as applied to the speed relationship embodiment, will be appreciated by those skilled in the art and are therefore encompassed herein.

Additionally, other indicators may also be displayed, such an indication of a numerical amount at which the calculated speed is above the permitted speed, instead of or in addition to display of the actual permitted speed and calculated speed themselves. This numerical value can be combined with a color display and/or can include numerical indicators in a manner similar to that of the leeway aspect of an embodiment of the present application previously described. In addition, other aspects such as flashing or otherwise highlighting the output indication if user exceeds another threshold such as speeding 10 kilometers per hour over the threshold can be utilized, noting that these other aspects such as flashing may be used in combination with color and/or numerical indicators for example. It should be noted that the speed thresholds of 5 and 10 kilometers per hour are arbitrary values as any of the thresholds can be set and stored in memory 230 of the navigation device 200. In addition, updates to the output indication can be varied in any manner such as periodically, difference exceeding a threshold, etc. as previously described with regard to the leeway aspect of an embodiment of the present application.

The methods of at least one embodiment expressed above may be implemented as a computer data signal embodied in the carrier wave or propagated signal that represents a sequence of instructions which, when executed by a processor (such as processor 304 of server 302, and/or processor 210 of navigation device 200 for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium, optical medium, etc.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBAL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising:
continuously determining a current speed using information received from satellites by a global positioning system (GPS) receiver in a navigation device during travel along a road, and outputting, on a color display of said navigation device, a numerical value of the current speed and a permitted speed for the road, an indication of a relationship between the permitted speed and the current speed and map information including a representation of said road,
said navigation device determining whether a speeding condition exists for a selected duration of time by continuously comparing said current speed with a permitted speed for said road, the permitted speed being stored in a memory of said navigation device, and, if a speeding condition is determined to exist for more than the selected duration of time, highlighting the indication of the relationship between the permitted speed for the road and the current speed by changing an output color of the indication of the relationship between the permitted speed for the road and the current speed on the color display of the navigation device to one of a plurality of colors and /or flashing the indication of the relationship between the permitted speed for the road and the current speed until such time as the speeding condition no longer exists.

2. The method of claim 1, wherein different output colors are associated with the current speed being greater than the permitted speed for more than the selected duration of time, and the current speed being less than the permitted speed for more than the selected duration of time.

3. The method of claim 1, wherein the output indication includes a numerical display, the numerical display indicates whether the current speed is greater than the permitted speed, equal to the permitted speed or less than permitted speed.

4. The method of claim 1, wherein the output indication includes a color display including at least one of a red, yellow and green color, the red color that the current speed is greater than a first speed for more than the selected duration of time, the yellow color indicates that the current speed is less than the first speed and greater than the permitted speed for more than the selected duration of time, and the green color indicates that the current speed is less than or equal to the permitted speed.

5. The method of claim 1, wherein navigation device changes the output color if the current speed exceeds a threshold speed for more than the selected duration of time.

6. The method of claim 5, wherein the threshold speed is greater than the permitted speed.

7. The method of claim 1, wherein the selected duration of time is 5 seconds.

8. A navigation device, configured to:
continuously determine a current speed using information received from satellites by a global positioning system (GPS) receiver in a navigation device during travel along a road, and outputting, on a color display of said navigation device, a numerical value of the current speed and a permitted speed for the road, an indication of a relationship between the permitted speed and the current speed and map information including a representation of said road,
determine whether a speeding condition exists for a selected duration of time by continuously comparing said current speed with said permitted speed for said road, the permitted speed being stored in a memory of said navigation device, and highlight the indication of the relationship between the permitted speed for the road and the current speed, if a speeding condition is determined to exist for more than the selected duration of time by changing an output color of the indication of the relationship between the permitted speed for the road and the current speed on the color display of the navigation device to one of a plurality of colors and/or flashing the indication of the relationship between the permitted speed for the road and the current speed until such time as the speeding condition no longer exist.

9. The navigation device of claim 8, wherein different output colors are associated with the current speed being greater than the permitted speed for more than the selected duration of time, and the current speed being less than the permitted speed for more than the selected duration of time.

10. The navigation device of claim 9, wherein the output indication includes a numerical display, the numerical display indicates whether the current speed is greater than the permitted speed, and has been greater than the permitted speed for more than the selected duration of time, or less than the permitted speed, and has been less than the permitted speed for more than the selected duration of time.

11. The navigation device of claim 8, wherein the output indication includes a numerical display, the numerical display indicates whether the current speed is greater than the permitted speed, and has been greater than the permitted speed for more than the selected duration of time, or less than the permitted speed, and has been less than the permitted speed for more than the selected duration of time.

12. The navigation device of claim 8, wherein the output indication includes a color display including at least one of a red, yellow and green color, the red color indicates the current speed is greater than a first speed for more than the selected duration of time, the yellow color indicates that the current speed is less than the first speed and greater than the permitted speed for more than the selected duration of time, and the green color indicates that the current speed is less than or equal to the permitted speed.

13. The navigation device of claim 8, wherein the navigation device is configured to change the output color if the current speed exceeds a threshold speed for more than the selected duration of time.

14. The navigation device of claim 13, wherein the threshold speed is greater than the permitted speed.

15. The navigation device of claim 8, wherein the selected duration of time is 5 seconds.

16. A non-transitory computer readable medium including program segments for, when executed on a processor of a navigation device performs a method, the method executed by the set of instructions comprising:

continuously determining a current speed using information received from satellites by a global positioning system (GPS) receiver in a navigation device during travel along a road, and outputting, on a color display of said navigation device, a numerical value of the current speed and a permitted speed for the road, an indication of a relationship between the permitted speed and the current speed and map information including a representation of said road, said navigation device determining whether a speeding condition exists for a selected duration of time by continuously comparing said current speed with a permitted speed for said road, the permitted speed being stored in a memory of said navigation device, and, if a speeding condition is determined to exist for more than the selected duration of time, highlighting the indication of the relationship between the permitted speed for the road and the current speed by changing an output color of the indication of the relationship between the permitted speed for the road and the current speed on the color display of the navigation device to one of a plurality of colors and/or flashing the indication of the relationship between the permitted speed for the road and the current speed until such time as the speeding condition no longer exist.

* * * * *